(12) United States Patent
MacNeal et al.

(10) Patent No.: US 8,336,577 B2
(45) Date of Patent: Dec. 25, 2012

(54) PRESSURIZED GAS CONTAINING SYSTEM

(75) Inventors: James R. MacNeal, Burton, OH (US); Edward L. Hamernik, Fridely, MN (US); David B. Larson, Maple Grove, MN (US); William T. Harrod, Mahtomedi, MN (US)

(73) Assignee: Praxair Technology, Inc., Danbury, CT (US)

( * ) Notice: Subject to any disclaimer, the term of this patent is extended or adjusted under 35 U.S.C. 154(b) by 722 days.

(21) Appl. No.: 12/384,464

(22) Filed: Apr. 3, 2009

(65) Prior Publication Data

US 2009/0301581 A1    Dec. 10, 2009

Related U.S. Application Data

(60) Provisional application No. 61/125,233, filed on Apr. 23, 2008.

(51) Int. Cl.
*G05D 16/04* (2006.01)
*F16K 15/18* (2006.01)
*F16K 27/08* (2006.01)

(52) U.S. Cl. ............ 137/613; 137/505.24; 137/505.14; 137/530

(58) Field of Classification Search ............. 137/613, 137/505.14, 505.24, 505.25, 507, 530, 382
See application file for complete search history.

(56) References Cited

U.S. PATENT DOCUMENTS

| | | | |
|---|---|---|---|
| 2,972,466 A * | 2/1961 | Allen et al. | 137/614.19 |
| 5,665,894 A | 9/1997 | Baker | |
| 5,996,625 A * | 12/1999 | Collado et al. | 137/505.25 |
| 6,986,350 B2 | 1/2006 | Zaiser et al. | |
| 7,080,655 B2 * | 7/2006 | Jacksier et al. | 137/613 |
| 7,448,594 B2 * | 11/2008 | Voege et al. | 137/507 |
| 7,594,639 B2 * | 9/2009 | Birch | 137/530 |

* cited by examiner

Primary Examiner — Kevin Lee

(57) ABSTRACT

A pressurized gas containing system has a cowling and mounting ring which supports a valve and regulator on a cylinder containing gas under pressure.

23 Claims, 13 Drawing Sheets

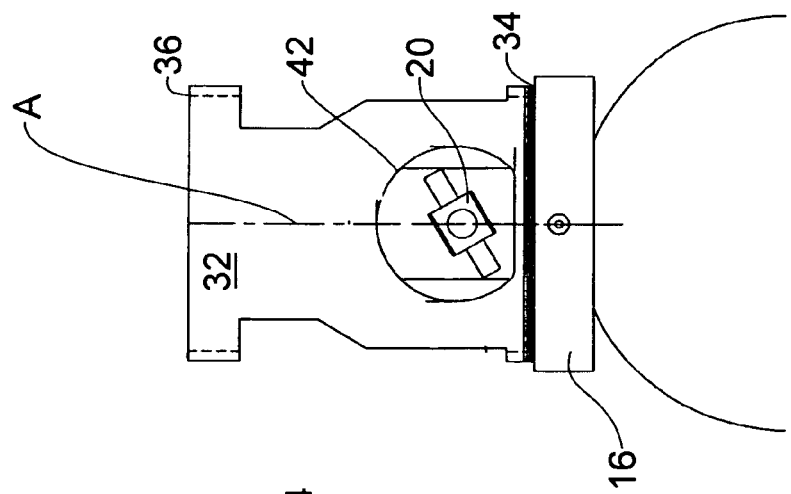
FIG. 3
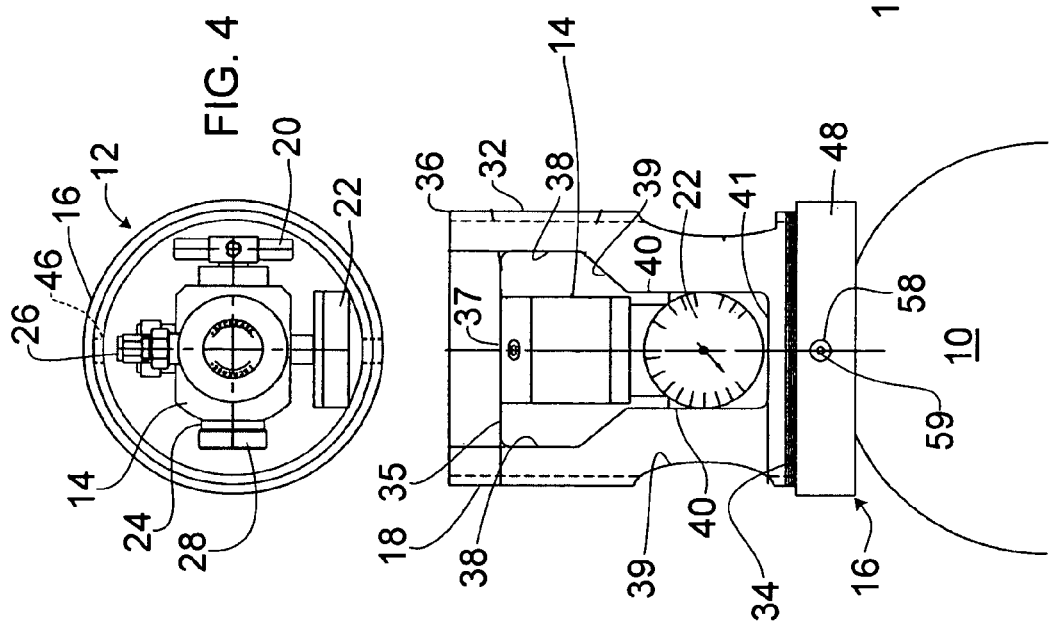
FIG. 4
FIG. 2
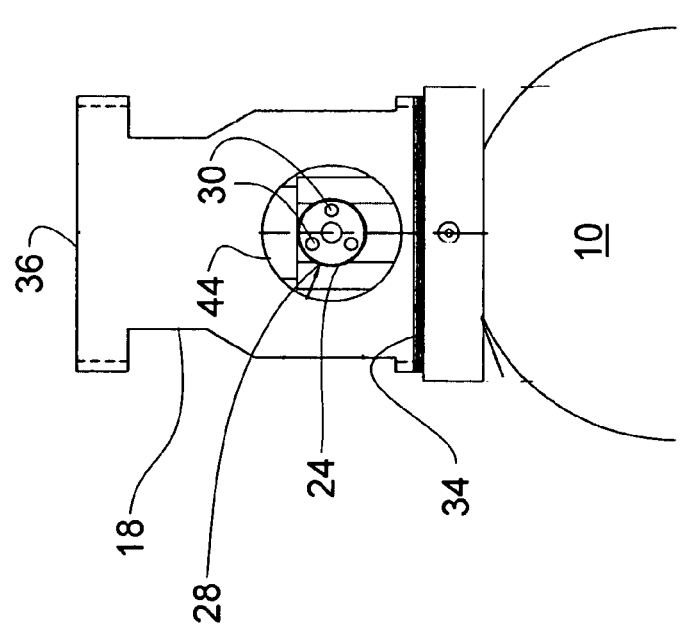
FIG. 1

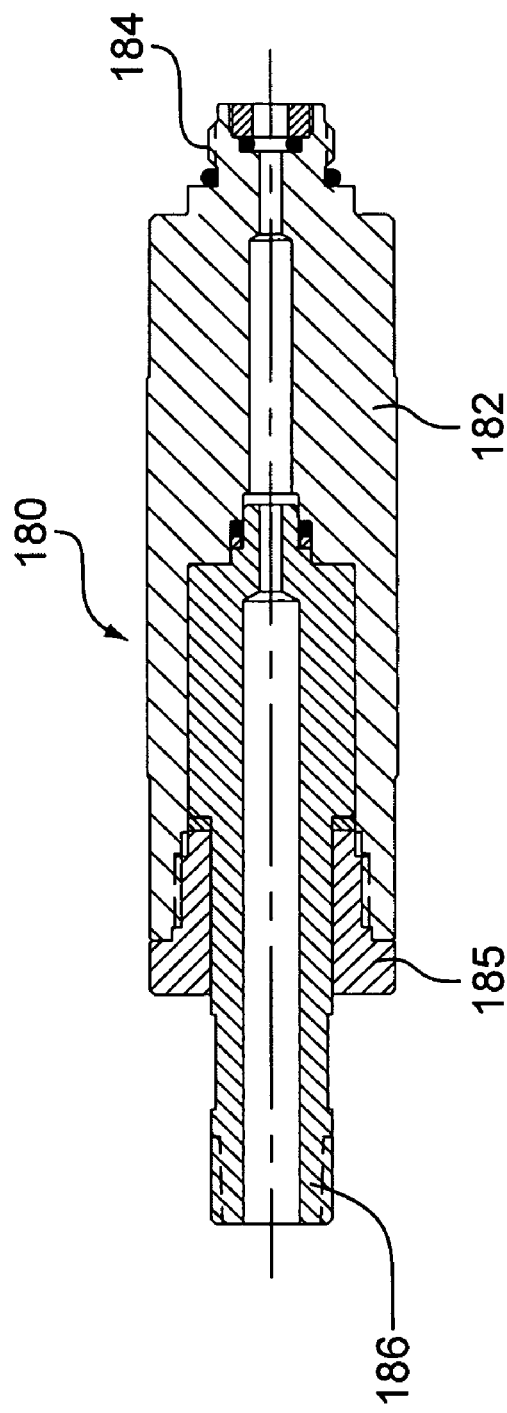
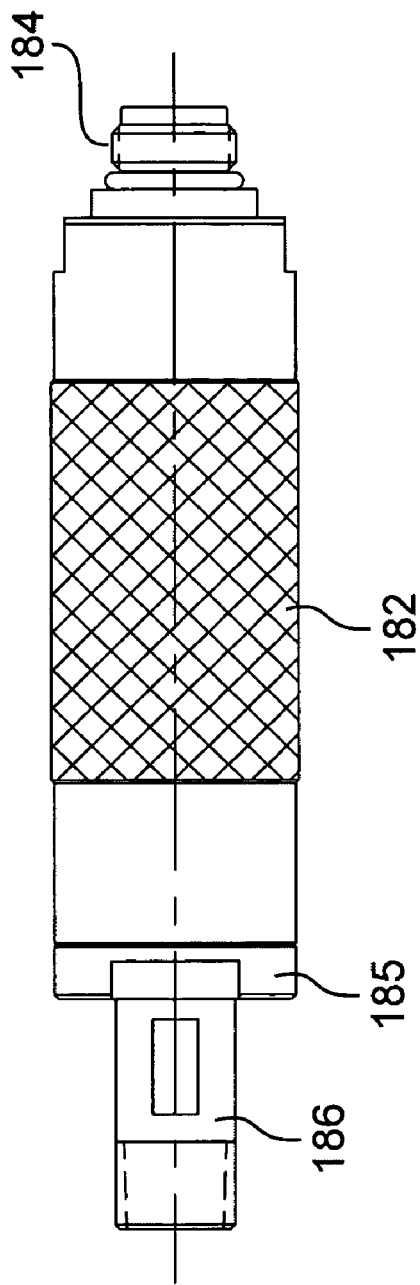
FIG. 13B
FIG. 13A

PRESSURIZED GAS CONTAINING SYSTEM

CROSS REFERENCE

The present application is based upon and claims the benefit of U.S. Provisional Application No. 61/125,233 filed Apr. 23, 2008.

BACKGROUND OF THE INVENTION

Pressurized gases for medical and other uses are normally contained in a cylinder with a dispensing valve mounted on the top. The cylinders are subject to receive bumps and impacts during transportation and handling which can damage the valve if it is not properly protected. Such cylinder valve combinations are typically configured with simple on-off valves and do not include pressure control or flow control. They lack the ability to deliver gases at desired pressures and flow rates including special applications in which approximately atmospheric pressure is desired. It is entirely important to the proper and accurate functioning of internal pumps engaged with certain air monitoring instrumentation that the valve combinations have the ability to deliver gases at approximately atmospheric pressure.

SUMMARY OF THE INVENTION

The present invention is directed to an integrated pressurized gas containing and delivery system including a dispensing valve, pressure and flow control elements and a valve protector. The system includes a new design of demand flow regulator, the feature of integrating the demand flow regulator into the dispensing appliance, a fixed pressure/fixed flow meter integrated with the pressure regulator and new designs of cowling and mounting ring for engagement with the cylinder containing the gas. The design of the mounting ring is such as to (1) provide the user with better observation in order to detect leakage and (2) provide sufficient flexibility to permit deformation upon receiving impacts without causing leakage. Such flexibility/deformability absorbs forces from such impacts which could otherwise damage the flow regulator or valve. The valve/flow regulator is provided with a gasket/O-ring formed of Viton® or other suitable fluoroelastomer material which provides excellent sealing at temperatures below those which are suitable for prior art Teflon® gaskets.

Under one embodiment, the new design of cowling permits it to be machined or molded in one piece, in contrast to prior art two-piece cowlings which require an extensive and expensive assembly operation.

Other objects and advantages of the present invention will become apparent to those skilled in the art upon a review of the following detailed description of the preferred embodiments and the accompanying drawings.

IN THE DRAWINGS

FIG. 1 is an elevational view showing one embodiment of valve, mounting ring and cowling attached to a cylinder tank of pressurized gas.

FIG. 2 is a view similar to FIG. 1 but showing the tank, valve, mounting ring and cowling rotated 90 degrees along the longitudinal axis of the tank.

FIG. 3 is a view similar to FIG. 1 but showing the tank, valve, mounting ring and cowling rotated 180 degrees.

FIG. 4 is a top plan view of the valve and cowling positioned in the direction of FIG. 2.

FIG. 13A is an elevational view of a swivel filling connector.

FIG. 13B is a sectional view of the connector of FIG. 13A.

DETAILED DESCRIPTION OF THE INVENTION

Figure 6:
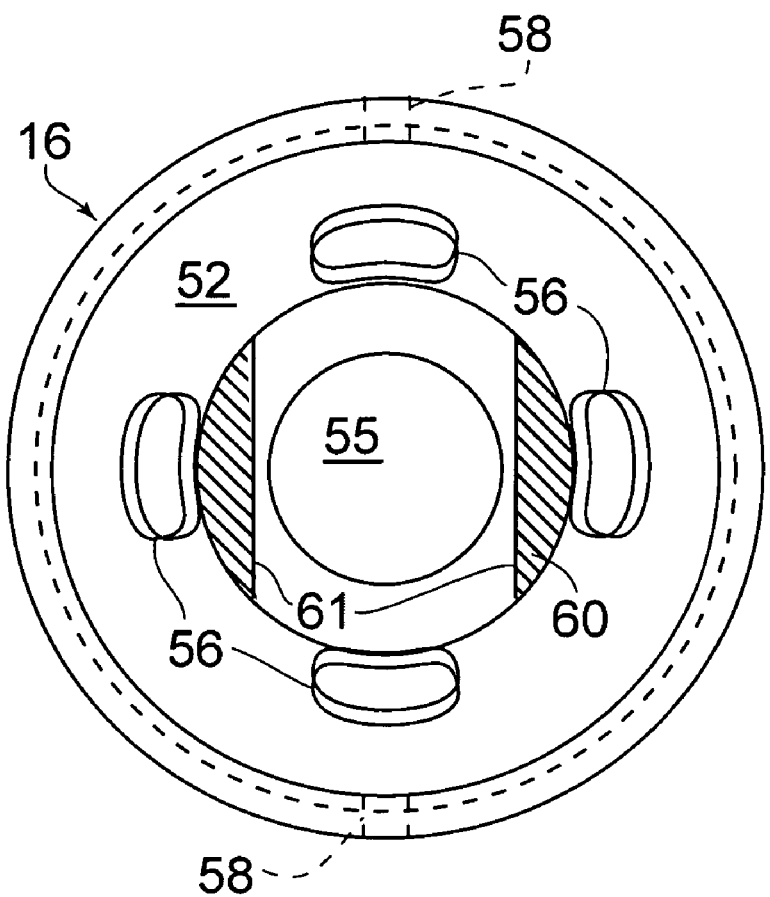
FIG. 6 is a plan view of the mounting ring of FIG. 5.

Referring to FIGS. 1-4, there is shown a cylinder 10 containing pressurized gas of a type, for example, used for medical applications or air monitoring instrument calibration such as oxygen, carbon monoxide, nitrous oxide and the like. Secured to the cylinder 10 is a dispensing assembly 12 comprising a fixed pressure adjustable flow regulator 14 supported on a mounting ring 16 and protected from bumping and other impacts by a cowling 18. The adjustable flow regulator 14 extends upwardly from the cylinder 10 and has an axis A lying on the longitudinal axis of the cylinder 10. The flow regulator 14 includes and is integrated with a rotary shut off valve 20, a cylinder content pressure gauge 22, a fill port 24 for introducing gas under pressure into the cylinder 10 and an outlet 26. The fill port 24 is provided with a sealed filling cover 28. The filling cover 28 is threadedly secured to the fill port 24 and is provided with a plurality (preferably 3) of apertures 30 facing outwardly which must be engaged by a special tool such as a spanner wrench for securing and removing the filling cover 28 from the fill port 24. The outer edge of the cover 28 is beveled in an attempt to prevent the use of pliers or other tool, with the objective of preventing personnel other than the fill plant personnel from accessing the fill connection.

The cowling 18 is machined or molded in one piece from a suitable plastic material such as polyacetal. It could also be machined from aluminum. The cowling 18 serves as a protective shield for the adjustable flow regulator 14. In contrast to prior art cowlings or protective shields which are manufactured in two pieces and which must be assembled, the cowling 18 of the present invention is manufactured, preferably injection molded or machined, in one piece. It is designed to be engaged to the mounting ring 16 so that the force of any impacts against the cowling 18 during handling is absorbed primarily by the cowling 18 and the mounting ring 16 to which it is attached. The combination of the cowling 18 and the mounting ring 16 thus serves to prevent destructive forces resulting from impacts during handling from damaging the adjustable flow regulator 14.

The cowling 18 may include a generally cylindrical wall portion 32 extending from a lower end having outwardly facing threads 34 to an upper end 36 which is above the top 37 of the flow regulator 14. The area of the cowling 18 intended to be aligned with the pressure gage 22 has a generally Y-shaped cut out which is defined by a top edge 35 spaced downwardly from and parallel to the upper end 36, a pair of edges 38 extending downwardly from the top edge 35 in parallel relationship to one another, downwardly and inwardly tapering edge portions 39 which terminate slightly above the top of the gauge 22. A pair of parallel edges 40 extend from the lower ends of the respective tapered portions 39 to a bottom edge 41. The bottom edge 41 is spaced slightly above the upper portion of the threads 34 and is generally aligned with or slightly below the lower portion of the gauge 22 such that the lower edge 41 and the parallel edges 40 define an opening through which the pressure gauge 22 may be viewed.

As shown in FIG. 3 the cylindrical wall portion 32 of the cowling 18 is provided with a valve access hole 42 which is aligned with the shut off valve 20. Referring to FIG. 1, the side of the cowling 18 opposite the valve access hole 42 is provided with an access hole 44 aligned with the fill port 24. The cowling 18 is additionally provided with an opening 46 in the area aligned with the outlet 26 to permit engagement of a tube for receiving gas dispensed from such outlet.

Figure 5:
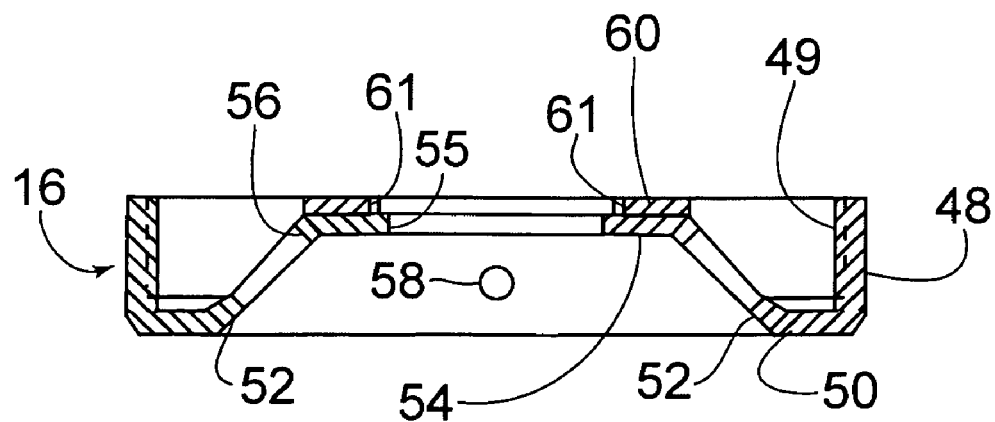
FIG. 5 is a sectional view of a mounting ring according to the present invention.

Referring to FIGS. 5 and 6, the mounting ring 16 is preferably formed of aluminum and has a circular outer ring 48 having internal threads 49 to receive the threads 34 of the cowling 18. Extending radially inwardly from the lower edge of the outer ring 48 is a bottom wall 50. Extending inwardly and upwardly from the bottom wall 50 at an angle of approximately 45° is a tapered wall section 52 which extends upwardly to a position approximately 0.1 inch below the upper edge of the outer ring 48. Preferably, the wall section 52 is thinner in the area adjacent to bottom wall 50 than in the area adjacent the top 54. The top 54 has a center hole 55 for receiving the flow regulator 14. The top 54 is joined to the upper portion of the tapered wall 52 and is spaced approximately 0.1 inch below the upper edge of the outer ring 48.

The tapered wall 52 is provided with four elliptical holes 56 adjacent the top 54 and spaced approximately 90° from one another. The holes 56 serve to provide an added measure of deformability and resilience to the mounting ring 16 for absorbing impacts received during handling and thereby protecting the flow regulator 14 from damage it might otherwise receive from absorbing the force of such impacts.

The outer ring 48 of the mounting ring 16 is provided with a pair of apertures 58 disposed 180° from one another for receiving rivets 59 (see FIG. 2) for providing additional stability to the connection of the cowling 18 to the mounting ring 16 and preventing any unintended rotation of the cowling 18 relative to the mounting ring 16. Any such unintended rotation could lead to leakage of pressurized gas from the cylinder, as well as hand and/or finger injuries due to unintended rotation of the cowling, thereby permitting contact of fingers with the regulator components.

The mounting ring 16 is also provided with a pair of raised areas 60 on the top 54. Each raised area 60 has an edge 61 parallel to the diameter of the mounting ring and parallel to each other on opposite sides of the hole 55. The adjustable flow pressure regulator 14 is positioned in the hole 55 and attached to the cylinder by conventional means well known in the art. The purpose of the raised areas 60 is to provide flat surfaces (i.e. edges 61) for engagement by matching flat surfaces of the pressure regulator 14 to prevent the pressure regulator from rotating relative to the mounting ring 16 after the components are assembled. The raised areas 60 may be first and second plates welded or otherwise affixed to said top 54.

An O-ring gasket manufactured of Viton® is provided in the connection between the adjustable flow regulator 14 and the cylinder 10. The use of a gasket manufactured from a fluoroelastomer material such as Viton® provides exceptionally good resistance to leakage particularly at cold temperatures, for example, temperatures below 0° F. The feature of providing four elliptical holes 56 in the tapered wall 52, in addition to providing enhanced deformability to the mounting ring 16, provides additional ports for viewing to determine whether any leakage of the pressurized gas is occurring.

Figure 7C:
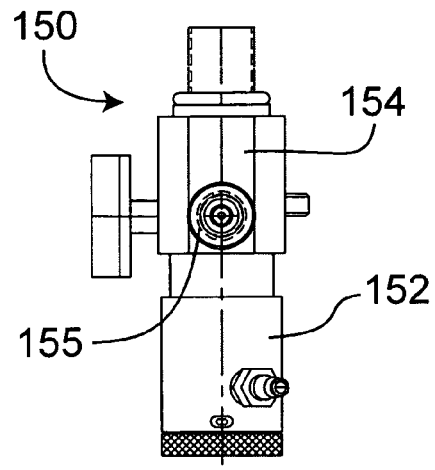
FIG. 7A to 7D are views of an integrated valve/adjustable flow regulator according to the present invention.
Figure 7D:
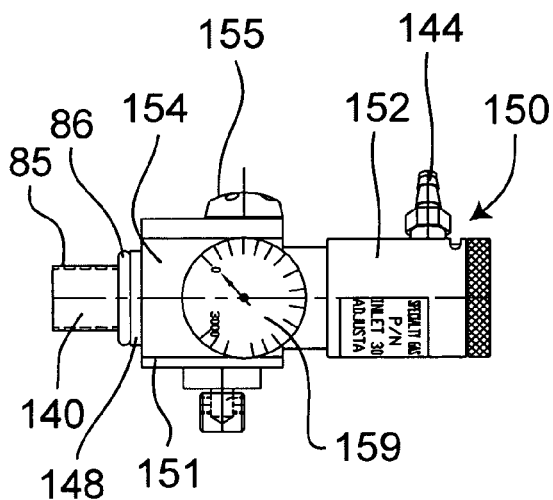
Figure 7B:
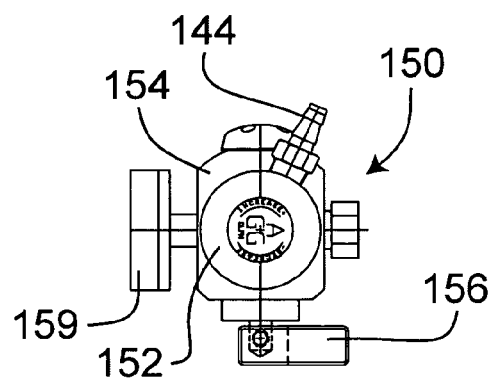
Figure 7A:
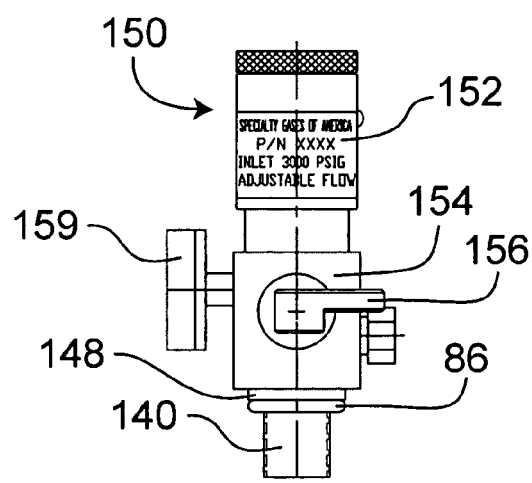
Figure 8:
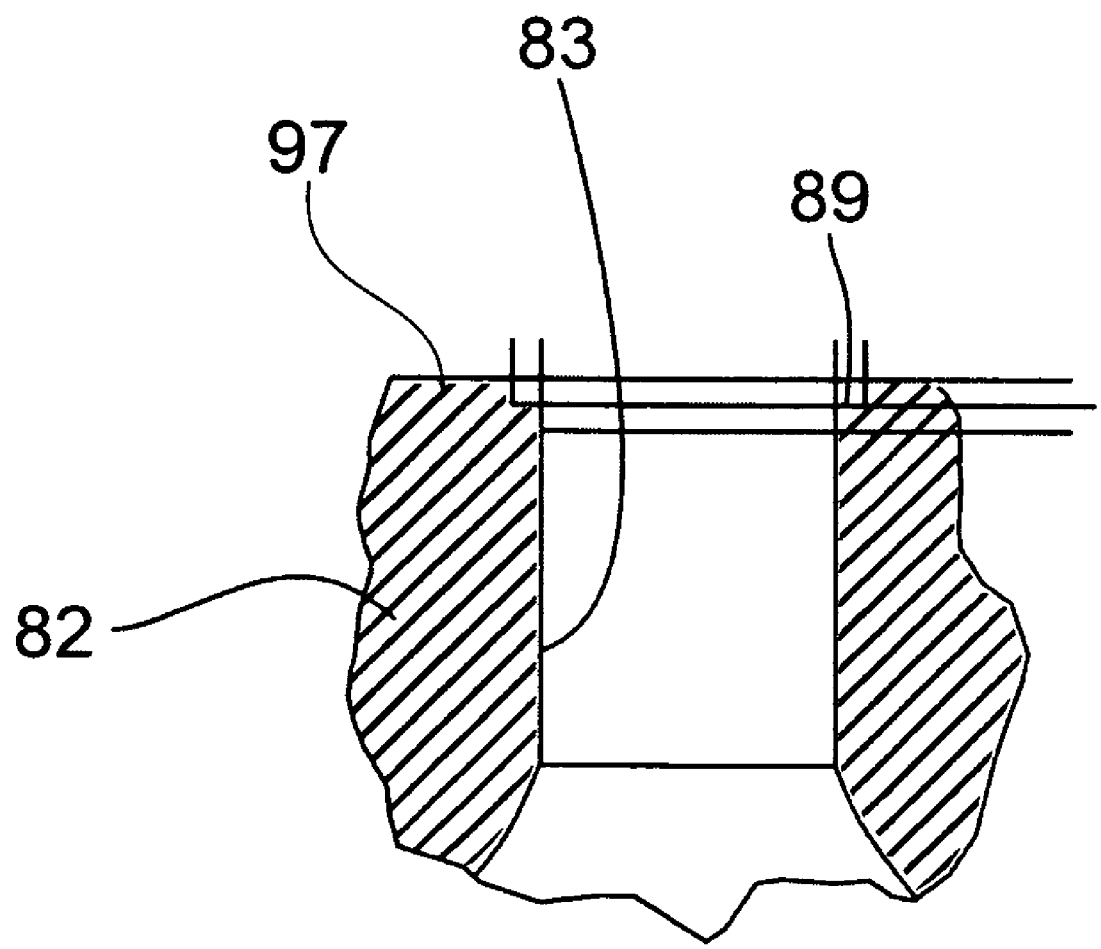
FIG. 8 is a fragmentary sectional view of a standard neck portion of metal cylinder containing gas under pressure to which an integrated combination of the present invention may be attached.

Referring to FIGS. 7A-7D there is shown an integrated combination 150 ready for installation on the neck 82 of a cylinder such as that shown in FIG. 8. The combination 150 includes a valve 151 and an adjustable flow regulator 152. The valve 151 has a rotary shut-off valve 156 and a pressure gauge 159 mounted on a housing or body member 154. Mounted on the body member 154 is an inlet-refill connection 155, a shut off valve 156 disposed 180° from the inlet-refill connection 155, a 3700 PSIG rupture disk 157 (actual burst pressure of the disk is set by US Department of Transportation regulations as incorporated by reference from Compressed Gas Association standard S-1.1). An outlet 144 extends from the adjustable flow regulator 152.

A tubular or cylindrical inlet connection 140 extends from the body member and has external threads 85 for engagement with the internal threads 83 of the neck 82 (FIG. 8) of the cylinder containing gas under pressure. An O-ring seal 86 of Viton® or similar flouroelastic material encircles the tubular connection 140 adjacent body member 154. The cylindrical inlet connection 140 extends through the center hole 55 of a mounting ring 16. See FIGS. 5 and 6. The lower surface of the top 54 of the mounting ring 16 rests on the rim or upper surface 97 of the neck 82 (FIG. 8). Upon engagement of the external threads 85 of the inlet connection 140 with the internal threads 83 of the neck 82 of the cylinder, the O-ring seal 86 will be squeezed against a recessed shoulder 89 of the neck 82 to provide a positive seal between the integrated combination 150 and the neck 82 such that the top 54 of the mounting ring 16 will be clamped against the rim 97. The lower end of the body member 154 has an extension 148 with a square cross section having four flat edges. Two opposing ones of the flat edges of the extension 148 are in engagement with the respective edges 61 of the mounting ring 16.

Figure 9B:
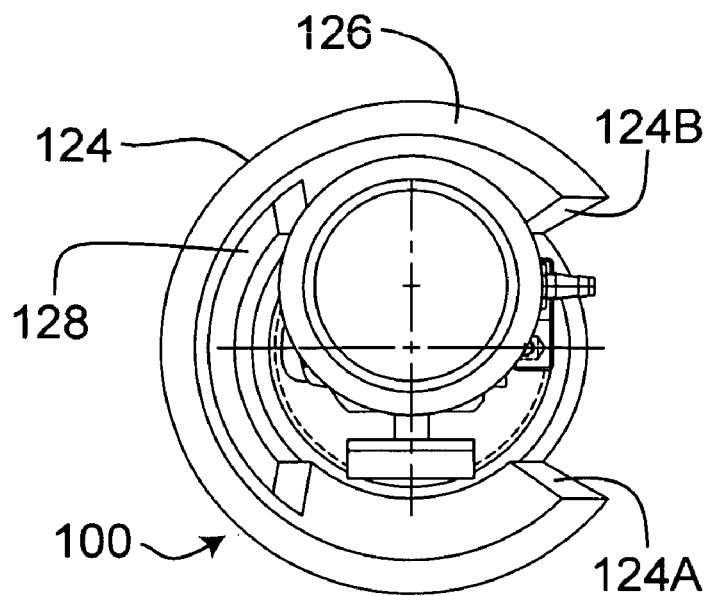
FIG. 9B is a top plan view the assembly shown in FIG. 9A.
Figure 9A:
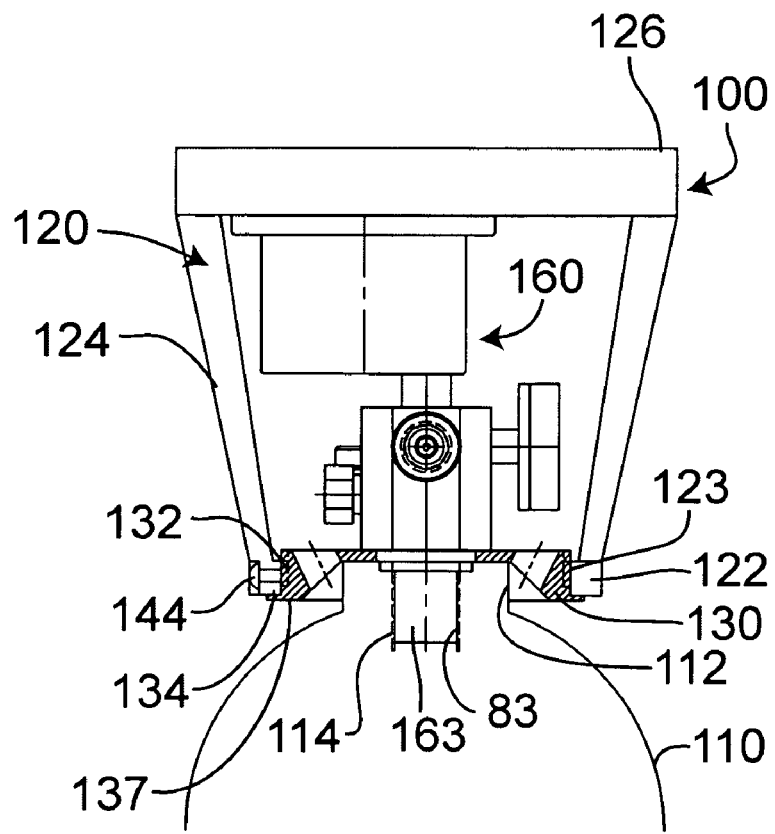
FIG. 9A is a fragmentary elevational view of an assembly of cowling, mounting ring and integrated valve and demand flow regulator.
Figure 11C:
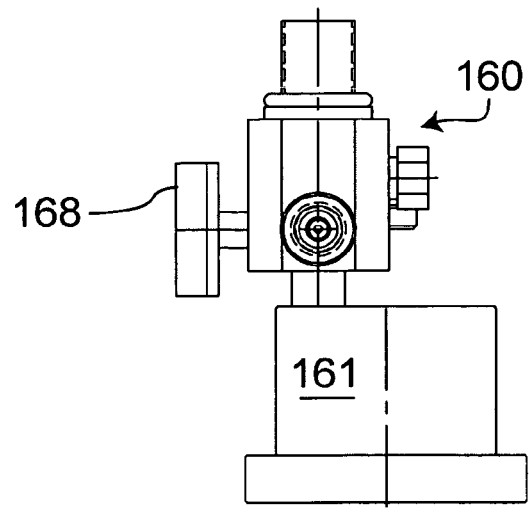
FIGS. 11A to 11F are views of the integrated valve demand flow regulator of the present invention.
Figure 11D:
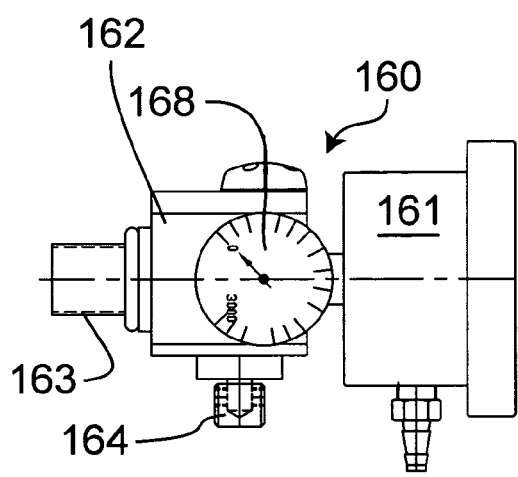
Figure 11B:
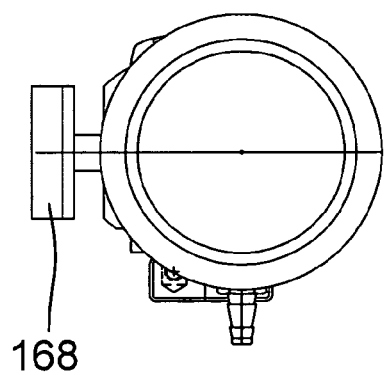
Figure 11A:
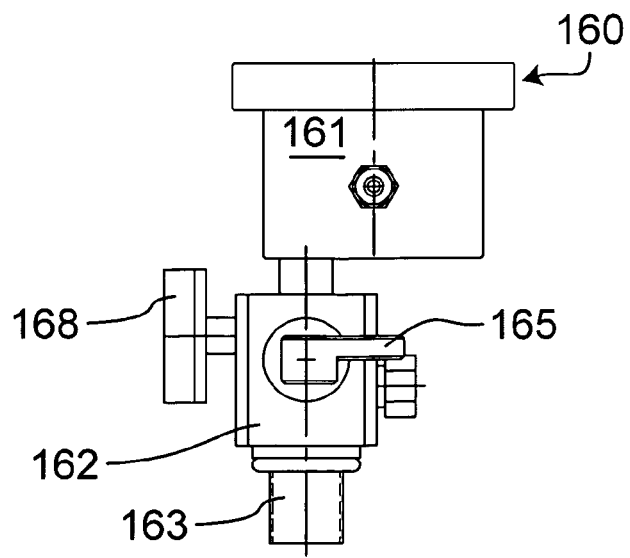

Referring now to FIGS. 9A and 9B there is shown a modified embodiment of a connector assembly 100 of a cowling 120 and mounting ring 130 that can have incorporated therein the various types of integrated combinations of valves and regulators including the valve-adjustable flow regulator of FIGS. 1-4, the vacuum breaker demand flow regulator to be described with respect to FIGS. 11A and 11B or the integrated valve-constant flow regulator described with respect to FIGS. 12A to 12F.

FIGS. 9A and 9B, show a cylinder 110 having a neck 82 as previously described with respect to FIG. 8 having inwardly facing threads 83, a flat upper surface 97 and a recessed shoulder 89 adjacent the outlet and downwardly from said upper surface 97. An integrated valve-demand flow regulator 160 is secured to the cylinder 110.

The assembly 100 includes a cowling 120 of a type which is standard in the industry. For example, the cowling 120 could be one manufactured by HyperKinetics Corporation, Williamstown, Vt. as its model No. ECH-5. The cowling 120 includes a base 122 having inwardly facing threads 123 and a wall member 124 tapering upwardly and outwardly from the base 122 to an upper edge 126. The wall member 124 defines an arc of a circle of approximately 270° to 300° and terminates in a pair end portions 124A and 124B which cooperate to define an opening through which a wrench maybe inserted for access to wrench flats of an integrated combination of one of the types noted above. The cowling may also have one or more openings 128 through which the integrated combination affixed to the cylinder 110 may be observed.

The cowling 120 is secured to a mounting ring 130 having a base 137 and a cylindrical wall or ring 132 with external threads. The base 137 includes a flange 134 extending radially outwardly from the threaded wall 132. As can be seen in FIG. 9A, the threads 123 of the cowling 120 are engaged to the threaded wall 132 of the mounting ring 130 with the base 122 of the cowling 120 resting upon the flange 134. See also FIGS. 10A and 10B.

The mounting ring 130 has a top 136 with an opening 138 through which a tubular inlet 140 of a combination integrated valve-regulator may be inserted. As with the embodiment of FIGS. 5 and 6, an angled wall 135 extends upwardly from the base 137 to the top 136. The top 136 lies in the same plane as that defined by the upper edge 132A of the wall or ring 132. Affixed to the top 136 are a pair of raised areas or plates 139 which are positioned on opposite sides of the opening and have straight edges 139A which are parallel to one another. The angled wall has openings 142, preferably elliptical in shape, for viewing the neck 112 of the cylinder 110 in the area adjacent its engagement by the top 136 of the mounting ring to ascertain whether there is any leakage of gas from the cylinder 110. A screw 144 extends through a threaded opening in the base of the cowling 120 and engages the wall 132 of the mounting ring 130 to put it in a fixed position following rotation to the desired position.

Referring to 11A-11F there is shown a combination 160 having an integrated demand flow regulator vacuum breaker 161 and valve body 162. A cylindrical inlet connection 163 has outwardly facing threads engageable with the threads 83 of the cylinder 110. The valve body 162 includes a refill connection port 164, a shut off valve 165 and a gauge 168.

Figure 10B:
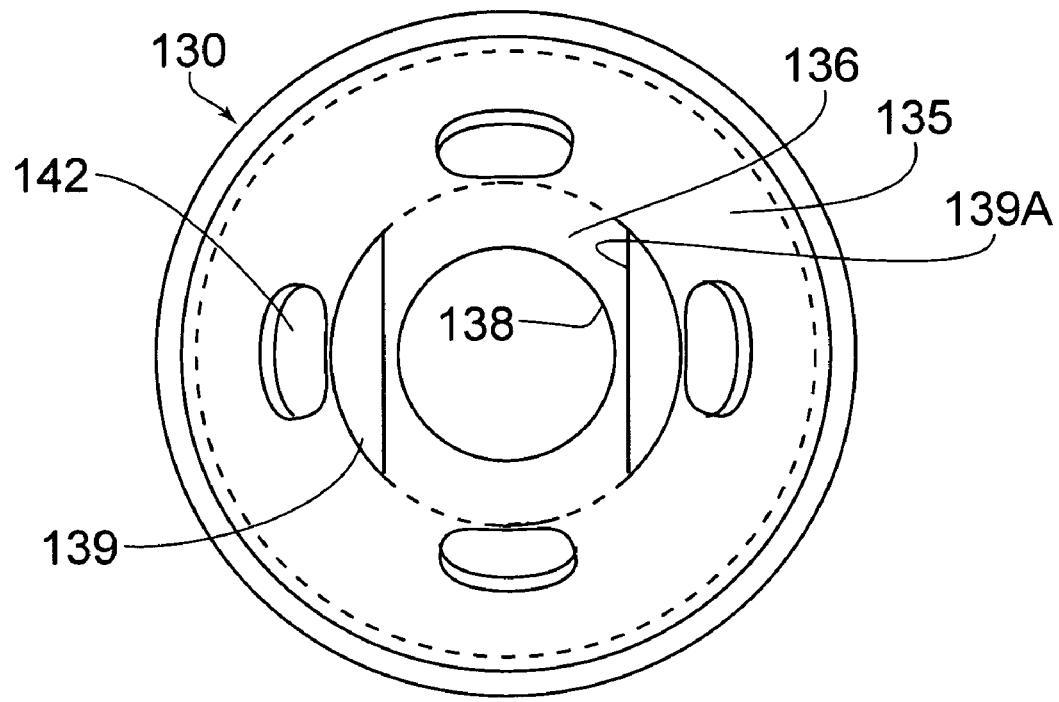
FIG. 10B is a top plan view of the mounting ring shown in FIG. 9A.
Figure 10A:
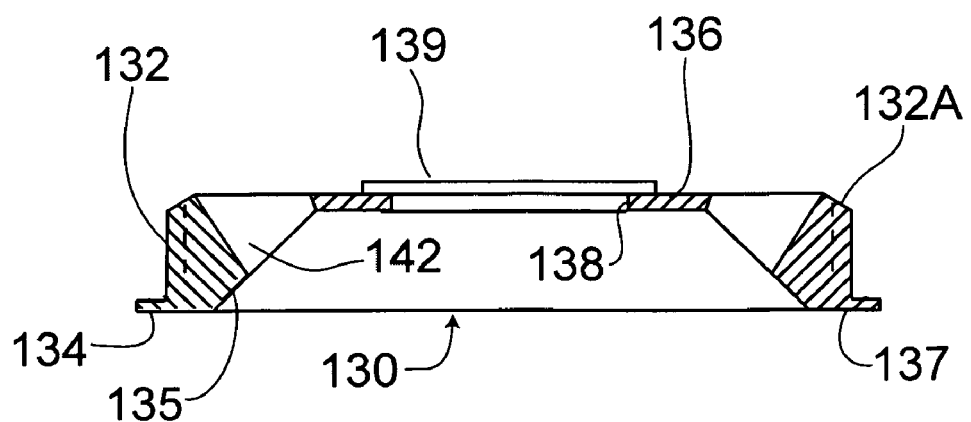
FIG. 10A is a sectional view of the mounting ring shown in FIG. 9A.
Figure 11E:
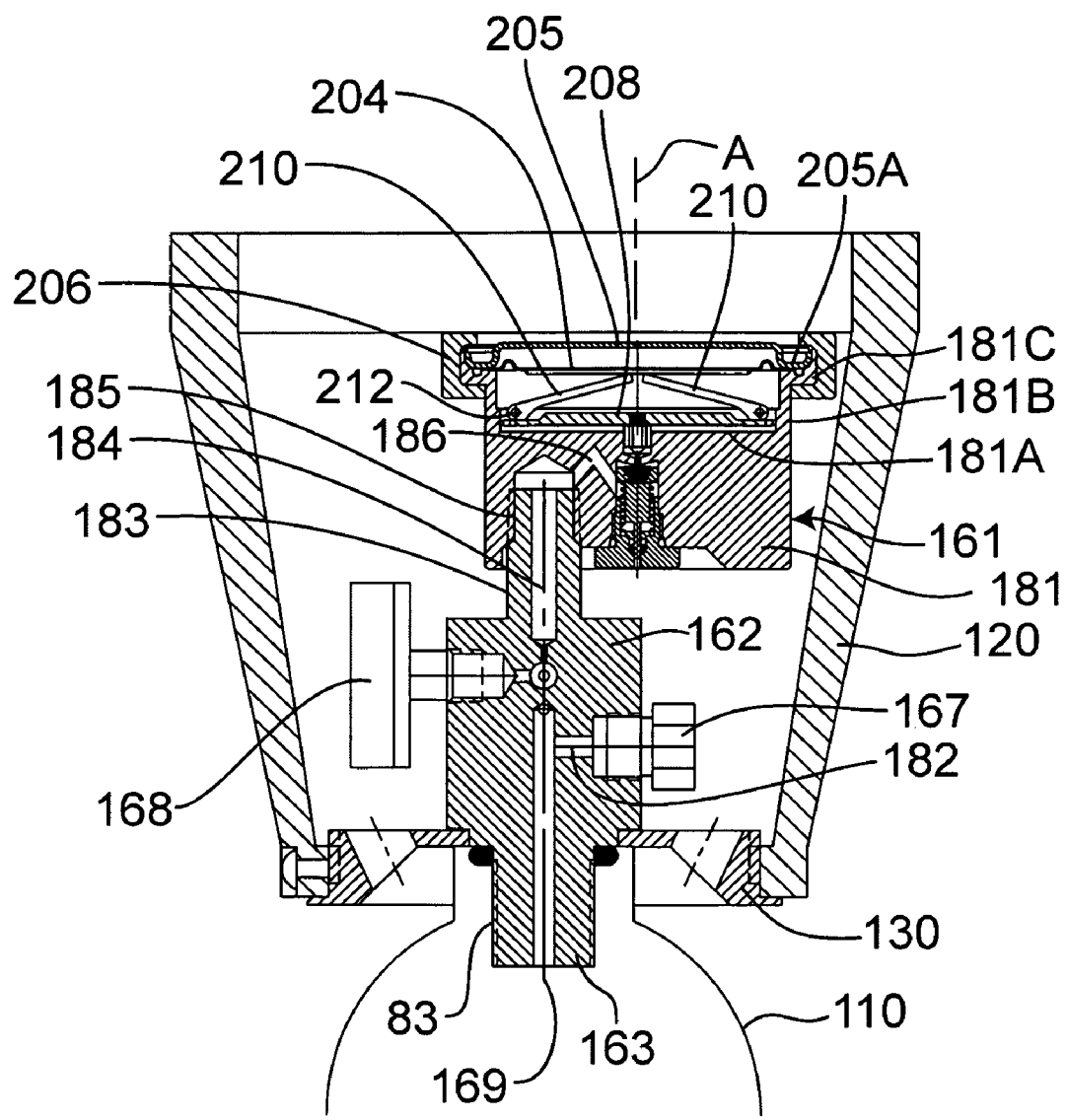
Figure 11F:
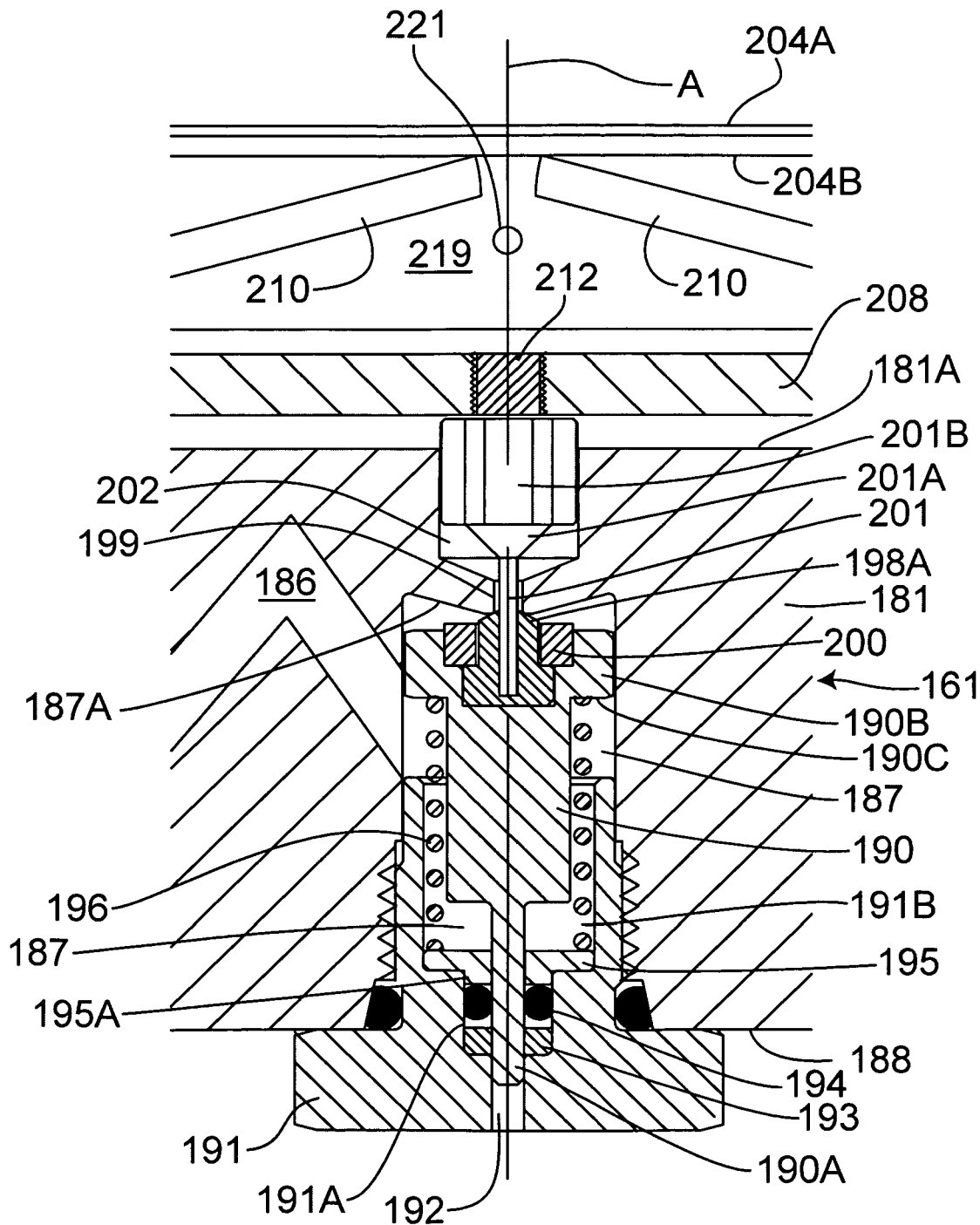

FIG. 11E is a sectional view of the combination integrated demand flow regulator vacuum breaker 161 and valve body 162 mounted on a mounting ring 130 of the type described with respect to FIGS. 10A and 10B with a standard cowling 120 secured thereto and FIG. 11F is an enlarged view of features of the demand flow regulator vacuum breaker 161. The valve body 162 includes a burst disk 167 on the opposite side from the pressure gauge 168. A central passageway 169 extends upwardly from the inlet connection 163 and joins with a second passageway 182 disposed at right angles thereto and communicating with the burst disk 167. The burst disk 167 can withstand pressures up to 3000 Psi. Extending upwardly from the valve body is a body extension 183 having a central passageway 184 and external threads 185 threadedly engaged to internal threads of the demand flow regulator vacuum breaker 161.

The demand flow vacuum breaker 161 has a V-shaped passageway 186 for receiving fluid from the passageway 184 of the valve 162.

The vacuum breaker regulator 161 has a central axis A which is offset from the central axis of the valve body 162 which is defined by the center of the passageways 169 and 184.

The vacuum breaker regulator is a single stage regulator in contrast to some prior art demand flow regulators such as that disclosed in U.S. Pat. No. 5,665,894 which is a two-stage demand flow device.

The vacuum breaker regulator 161 includes a chamber 187 which extends along axis A upwardly from the lower surface 188 of the housing 181. Positioned in the chamber 187 is a poppet valve 190 extending from a reduced size lower extension 190A to an enlarged upper flange 190B having a radially extending shoulder 190C at the lower end thereof.

Encircling the poppet valve extension 190A and a major portion of the central portion of the poppet valve 190 is a valve housing 191 having a central passageway 192 in which the lower poppet valve extension 190A is slidably positioned. The valve housing 191 has a lower chamber 191A in which is positioned a Teflon back up ring 193 and an O-ring seal 194 effecting a seal between the chamber 191A and the poppet valve extension 190A. Above the reduced size chamber 191A of the valve housing 191 is an enlarged upper chamber 191B. A valve guide 195 is positioned in the upper chamber 191B and has a lower reduced size portion 195A which extends into the reduced size lower chamber 191A. A compression spring 196 is positioned in the upper chamber 191B and rests against the valve guide 195 at the lower end and the poppet valve radial flange lower surface 190C to yieldingly urge the poppet valve 190 to a sealed position.

A Teflon® seal 198 is positioned at the upper end of the poppet valve 190 and has an outwardly convexed sealing surface 198A which engages and effects a seal of an upper passageway 199 of the body 181. A stainless steel collar 200 encircles a reduced size upper portion of the Teflon seal 198 to support it in the enlarged upper portion 190B of the poppet valve.

The upper surface 187A of the chamber 187 tapers downwardly toward the passageway 199 in order to permit the convex upper surface 198A of the Teflon seal 198 to effect a sound seal to close the passageway 199 when so desired. Connected to and extending from the Teflon seal 198 is an actuator pin 201 having a lower cylindrical portion which extends outwardly from a lower cylindrical portion to a conical portion 201A from which extends a hexagonal head portion 201B. The conical portion 201A and enlarged hexagonal portion 201B are positioned in a cylindrical chamber 202 at the upper end of the body 181. As a result of the actuator pin hexagonally shaped head 201B being positioned in the chamber 202 which is cylindrical in shape, a flow passage is provided between the hex flats of the enlarged head 201B and the cylindrical wall of the chamber 202.

The upper end of the body 181 has an upper surface 181A and a substantially cylindrical wall 181B extending upwardly therefrom. The cylindrical wall 181B terminates in a radially outwardly extending flange 181C. The flange 181C defines a circle and serves to support the outer edge of a deformable diaphragm 204 and a nickel bonnet 205. The diaphragm 204 includes an upper elastomer sheet 204A adhered to a thin stainless steel disk 204B. The stainless steel disk is sufficiently thin, on the order of 0.030 inch, to be deformable a downwardly along with the layer of elastomer 204A. The bonnet 205, which is not shown in FIG. 11F, has, at its outer periphery, downwardly extending U-shaped portion 205A which engages the outer periphery of the diaphragm 204. A collar 206 clamps the bonnet 205 and the diaphragm 204 to the radial flange 181C of the body 181.

Positioned in the space between the diaphragm 204 and the upper surface 181A of the body 181 is a loading lever 208 formed of stainless steel. The loading lever has a thickness on the order of 0.090 inch which is sufficient to provide significant rigidity to the loading lever to permit it to act upon the poppet valve to move the poppet valve 190 to an open position when the loading lever is caused to move downwardly as hereinafter described.

A pair of cam levers 210 are pivotally supported in the space 219 in between the diaphragm 204 and the loading lever 208. Cam levers 210 are mounted on hinges 212 and are resiliently urged at an angle upwardly into contact with the stainless steel member 204B of the diaphragm 204. Upon a reduction in air pressure to sub-atmospheric in the space 219 occupied by the cam levers 210 as a result of the demand for gas from an outside source, the diaphragm 204 will be sucked downwardly thereby pushing the cam levers 210 into engagement with the loading lever 208 to thereby push the loading lever 208 downwardly to a position at which an adjustable screw 212 engages the upper end of the hexagonally shaped portion 201B of the actuator pin thereby moving the poppet valve 190 downwardly to disengage the Teflon seal 198 from the end 187A of the chamber, thereby opening the passageway 199 to permit the flow of gas. The stainless member 204B protects the elastomer sheet 204A from being damaged by the cam levers 210.

Gas flows from the 219 through and outlet 221 to instrumentation connected thereto. When the instrumentation demands more gas, it creates a partial vacuum thereby sucking the diaphragm downwardly to open the passageway 199.

Threadedly position in the center of the loading lever 208 is an adjusting screw 212. The adjusting screw 212 can be rotated to one of a variety of positions extending below the loading lever 208 to thereby precisely set the regulator to a position for opening the poppet valve 190 at the precise amount of pressure as demanded by instrumentation attached to an outlet 221 of the regulator.

The demand for gas by outside instrumentation connected to the inlet 221 communicating with the space 219 below the flexible diaphragm creates a partial vacuum which causes the flexible diaphragm to be drawn downwardly carrying with it the cam levers 210 which then contact the loading lever 208 pushing it downwardly to a position at which the adjustable screw 212 contacts the enlarged head 201B of the actuator pin 200. Continued downward movement of the loading lever 208 causes the Teflon® seal 198 to move downwardly out of engagement with upper surface 187A thereby opening the passageway 199 to the flow of gas to the outside instrumentation. As previously noted adjustment of the screw 212 permits precise adjustment of pressure and the flow of gas.

The diaphragm 204 acts as a sensing element to control the movement of the Teflon seal 198 and, thereby, the opening and closing of the passageway 199. By virtue of the diaphragm 204, the regulator of the present invention has a sensitivity such that it can be opened at a much lower pressure (crack pressure) than prior art vacuum breaker/demand flow regulators. Thus, the regulator of the embodiment of FIGS. 11A to 11F can be opened at a vacuum pressure of 1.5 inches of water pressure (0.05 psig) as compared with prior art demand regulators which require crack pressures of 3 inches of water pressure or more. This degree of sensitivity, coupled with the feature of the adjusting screw 212 provides a vacuum breaker/demand flow regulator with greater sensitivity than similar types of prior art regulators.

Referring FIGS. 12A-12F, there is show an integrated combination 170 in which there is provided a constant or fixed flow regulator 172 having integrally attached thereto a valve body 174 from which extends a cylinder inlet connection 175. The valve body 174 has a refill connection 176 and a shut off valve 177 on the opposite side of the valve body 174 therefrom. The valve body 174 has a pressure gauge 178.

Figure 12C:
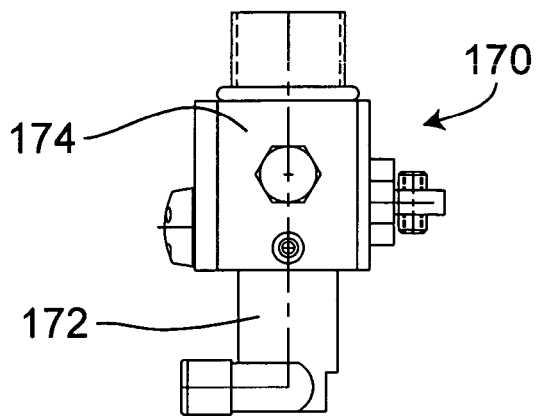
FIGS. 12A to 12F are views of integrated valve/constant flow regulator.
Figure 12D:
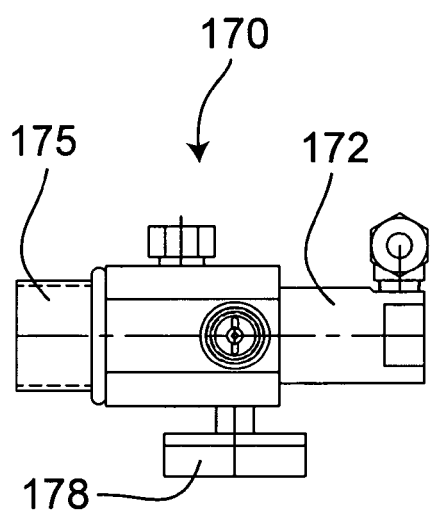
Figure 12B:
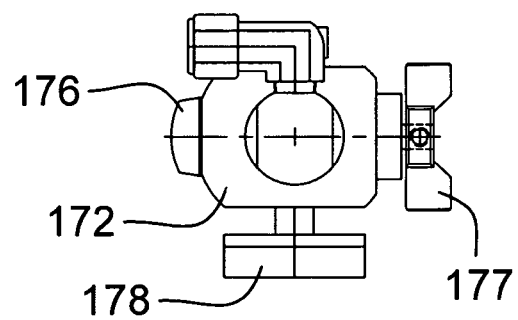
Figure 12A:
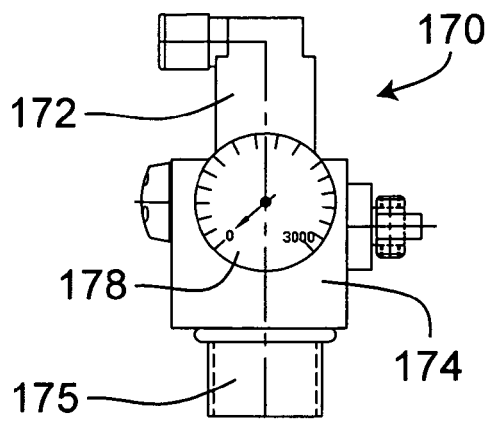
Figure 12E:
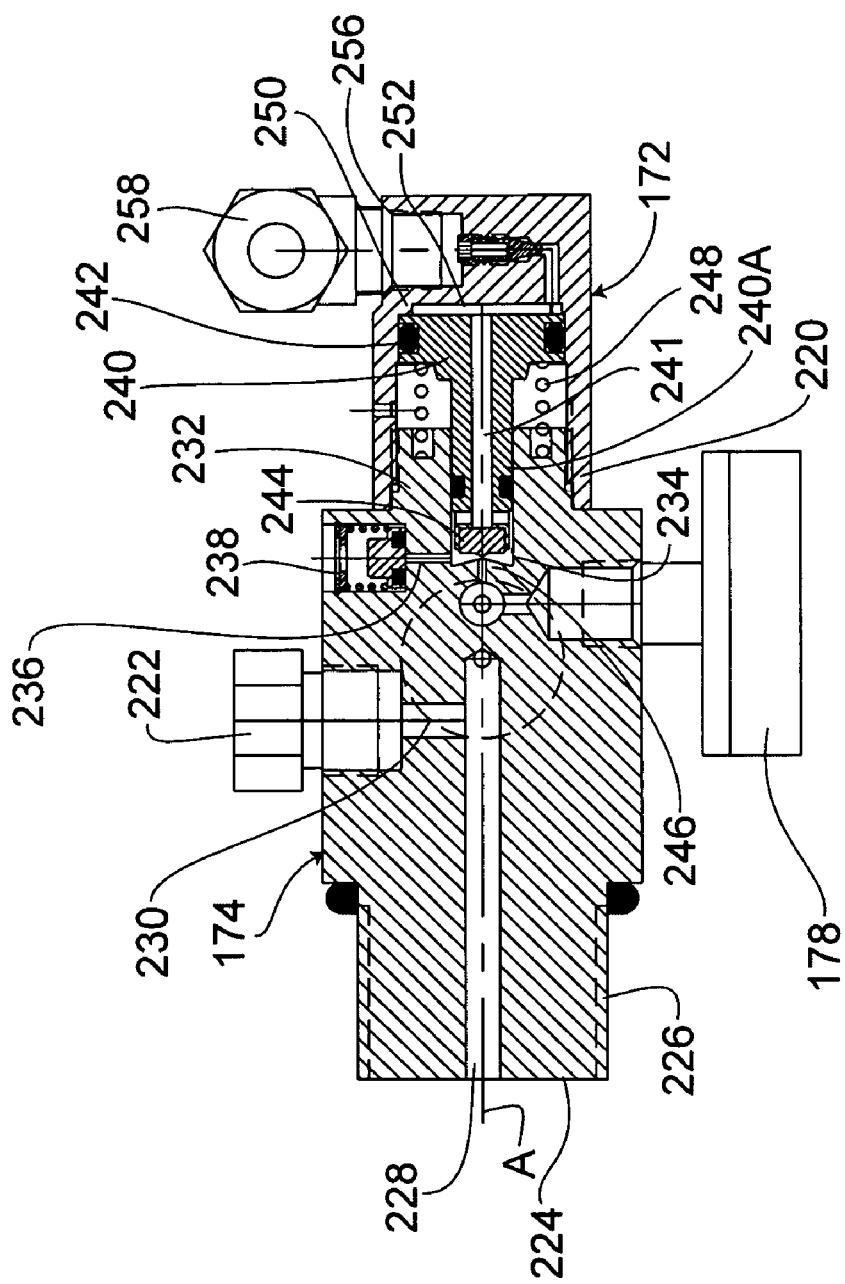
Figure 12F:
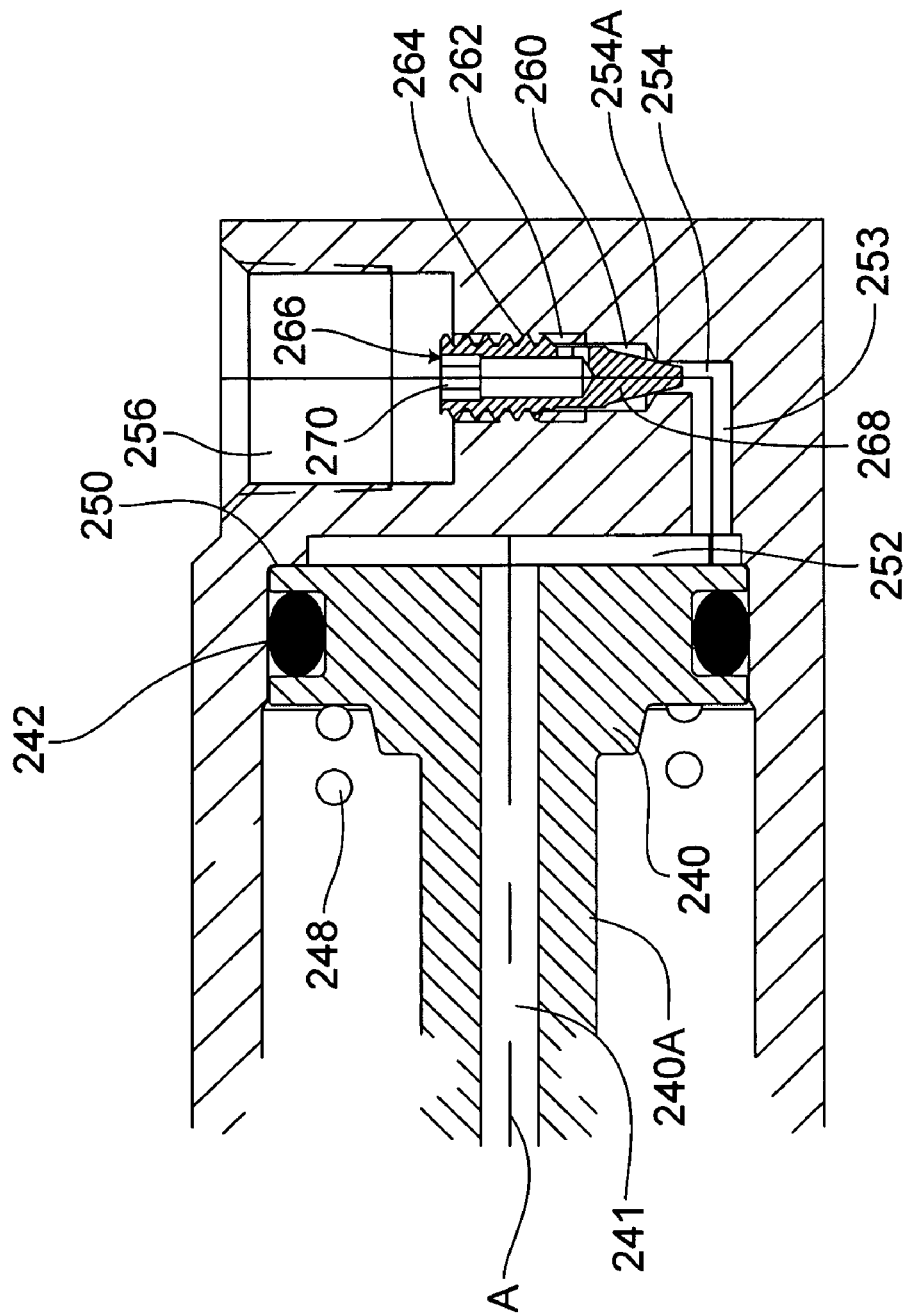

As may be seen particularly in FIGS. 12E and 12F, the regulator 172 inclues a body 220 secured to the valve body 174. The valve body 174 has a inlet end 224 with outwardly facing threads 226 for engagement with the neck of a cylinder of compressed gas. An inlet passageway 228 extends along the axis of the valve body 174.

The valve body has a lateral passageway 230 leading to an enlarged chamber in which a burst disk assembly 222 is positioned. The pressure gauge 178 is on the opposite side of the body 174 from the burst disk.

The valve body 174 has a reduced size outlet end 232 with outwardly facing threads to which the constant flow pressure regulator 172 may be secured. A cylindrical chamber 234 extends inwardly from the outlet end on axis A. Extending laterally from the end of the chamber 234 is an additional lateral passageway 236 leading to a chamber in which is positioned a pressure relief valve 238 for the regulator.

The constant flow regulator 172 has a chamber in which it is positioned a piston 240 having an enlarged portion yieldingly movable axially in engagement with the side wall of the regulator chamber. An annular seal 242 is positioned in a recess of the enlarged head of the piston 240 and sealingly engages the sidewall of the regulator chamber. The piston 240 has a passageway 241 extending along axis A.

Extending axially from the enlarged head of the piston 240 is a reduced diameter section 240A which is slidably received in the cylindrical chamber 234 of the valve body 174. A Teflon® seat 244 is mounted on the end of the reduced cylindrical portion 240A of the piston 240 and is sealingly engageable with an outlet passage 246 of the valve 174. The Teflon seat 244 has a size smaller than the diameter of the chamber 234 so that when the seat 244 is out of engagement with the outlet passage 246, gas flow through the outlet passage 246 will flow around the Teflon seat 244, through a lateral passageway and into axially extending passageway 241.

A compression spring 248 yieldingly urges the piston 240 toward the right as viewed in FIGS. 12E and 12F and into engagement with a shoulder 250 at the outlet end of the regulator. The shoulder 250 is spaced from the end of the chamber in order to leave a space 252 for gas to flow to a longitudinal passageway 253 and then to a lateral passageway 254 at the end of the regulator. The lateral passageway 254 leads to an outlet 256 in which is positioned an outlet fitting 258 with a Swage LOC® fitting.

The lateral passageway 254 opens to a first enlarged chamber 260 and then to a second still larger chamber 262 which has inwardly facing threads 264. Positioned in the first and second enlarged chambers 260, 262 is a needle valve 266 having outwardly facing threads engaged to the threads 264 and having, at its distal end, a tapered nose 268. The opposing end of the needle valve is provided with a recess with hex-shaped flats 270 for receiving a tool for rotatably adjusting the needle valve 266 in the first and second chambers 260, 262. As can be seen in FIG. 12F, the needle valve 266 can be rotated to a position which completely closes the lateral passageway 254 by being rotated to a position at which the tapered nose 286 engages the outlet end 254A of the cylindrical portion of the lateral passageway 254. By rotating the needle valve 266, it is possible to precisely control the size of opening between the tapered nose 268 and the outlet end 254A of the cylindrical portion of the lateral passageway 254. Varying the size of such opening varies the rate of gas flow therethrough and the pressure.

It is possible to utilize a standard design of cowling such as that shown in FIGS. 7A and 7B and the same type of mounting ring 130 for each of the integrated combinations 150, 160 and 170. As will be readily appreciated this reduces the number of types cowling required to be maintained in stock and the number mounting rings to be maintained in stock thereby greatly increasing the efficiency of providing cylinders having a variety of types of integrated combinations and reducing the overall costs.

Referring FIGS. 13A and 13B, there is shown a new filling connector 180 which incorporates a swivel feature for greatly simplifying the procedure for refilling a cylinder 110 with pressurized gas from a storage tank. The swivel connector 180 has an enlarged body 182 with an externally threaded connection 184 for engagement with the refill connection ports 155, 164 or 176 of the embodiments of FIGS. 7A-7D, 11A-11F and 12A-12F. Extending from the end of the enlarged body 182 opposite that of the filling connection 184 is an inlet port 186 for connection to a central storage tank of the type of gas to be introduced into the cylinder 110. The thread neck 184 is sized to be screwed into the respective refill connections 155, 164 or 176 of the respective embodiments of FIGS. 7A-7D, 11A-11F and 12A-12F.

The end of the enlarged body 182 opposite the neck 184 has a rotatable swivel nut 185 sized to receive and snuggly engage an inlet tube 186 such as a ¼-18 an NPT. With this construction, the swivel filling connector 180 can have the inlet tube 186 engaged to the outlet to a supply tank in fixed relationship thereto. With the inlet tube 186 so affixed, the enlarged body 182 and its integral filling connection 184 may be rotated to threadedly engage the filling connection 184 to one of the respective refill connections 155, 164 or 176. The use of the swivel filling connection 180 greatly simplifies the steps required for connecting a storage tank of gas to be refilled to a cylinder over that utilized in the prior art, and provides superior leak integrity to the connection by preventing cross threads of threaded member.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. An apparatus for use in dispensing gas from a container containing gas under pressure comprising:
   an integrated combination of (A) a single stage demand vacuum breaker regulator, said regulator having an outlet for dispensing said gas and (B) a valve engaged thereto, said valve having a tubular inlet extending along a first axis for engagement with said container and a tubular outlet lying on said first axis,
   said vacuum breaker regulator having a body member with (i) a central passageway and an enlarged chamber lying on a second axis displaced from said first axis, said enlarged chamber having an outlet; (ii) a second chamber lying on said first axis and engaged by said valve tubular outlet for receiving gas therefrom, (iii) a passageway for delivering gas from said second chamber to said enlarged chamber, (iv) a poppet valve in said enlarged chamber for opening and sealing said outlet, said valve being yielding urged to a closed position, (v) a loading lever movable into and out of engagement with said poppet valve, (vi) a diaphragm movable toward said loading lever upon creation of a partial vacuum between said diaphragm and said loading lever and (vii) at least one cam lever movable between a position spaced from said loading lever to a position engaged to said loading lever upon movement of said diaphragm thereagainst.

2. An apparatus according to claim 1 further including adjustment means on said loading lever for limiting the extent to which said poppet valve can be opened.

3. An apparatus according to claim 1 wherein said diaphragm has a first layer of elastomer and a second layer of metal, said second layer being positioned to be engaged by said cam lever.

4. An apparatus according to claim 3 wherein said second layer is stainless steel having a thickness no greater than 0.030 inch.

5. An apparatus according to claim 1 wherein the said regulator has the capability of opening said poppet valve at a pressure as low as 1.5 inches of water pressure.

6. An apparatus according to claim 1 further including an adjustment mechanism on said loading lever to vary the amount of pressure required to open said poppet valve.

7. An apparatus according to claim 6 wherein said adjustment mechanism is threadedly engaged to said loading lever on said second axis.

8. An apparatus for use in dispensing gas from a container containing gas under pressure comprising:
   an integrated combination of (i) vacuum breaker regulator, said regulator having an outlet for dispensing said gas and (ii) a valve engaged thereto, said valve having a tubular inlet extending along a first axis for engagement with said container, an inlet to said vacuum breaker regulator lying on said first axis, a chamber and poppet valve communicating with said inlet and lying on a second axis spaced from said first axis and means for opening said poppet valve comprising a loading lever movable into and out of engagement with said poppet valve, a diaphragm movable toward said loading lever upon creation of a partial vacuum between said diaphragm and said loading lever and at least one cam lever movable between a position spaced from said loading lever to a position engaged to said loading lever upon movement of said diaphragm thereagainst.

9. An apparatus for use in dispensing gas from a container containing gas under pressure comprising:
   an integrated combination of (A) a single stage demand vacuum breaker regulator, said regulator having an outlet for dispensing said gas and (B) a valve engaged thereto and to said container;
   said vacuum breaker regulator having a body member with (i) a chamber lying on an axis, said chamber having an inlet for receiving gas from said valve and an outlet; (ii) a poppet valve in said chamber for opening and sealing said outlet, said poppet valve being yieldingly urged to a closed position, (iii) a loading lever movable to actuate said poppet valve, (iv) a diaphragm movable toward said loading lever upon creation of a partial vacuum between said diaphragm and said loading lever and (v) at least one cam lever movable between a position spaced from said loading lever to a position engaged to said loading lever upon movement of said diaphragm thereagainst.

10. An apparatus according to claim 9 further including adjustment means on said loading lever for limiting the extent to which said poppet valve can be opened.

11. An apparatus according to claim 9 wherein said diaphragm has a first layer of elastomer and a second layer of metal, said second layer being positioned to be engaged by said cam lever.

12. An apparatus according to claim 11 wherein said second layer is stainless steel having a thickness no greater than 0.030 inch.

13. An apparatus according to claim 9 wherein the said regulator has the capability of opening said poppet valve at a pressure as low as 1.5 inches of water pressure.

14. An apparatus according to claim 9 further including an adjustment mechanism on said loading lever to vary the amount of pressure required to open said poppet valve.

15. An apparatus according to claim 13 wherein said adjustment mechanism is threadedly engaged to said loading lever.

16. An apparatus for using in dispensing gas from a container containing gas under pressure comprising:

an integrated combination of (i) vacuum breaker regulator, said regulator having a chamber and an outlet for dispensing said gas and (ii) a valve engaged thereto and to said container, a passageway from said valve to said vacuum breaker regulator chamber, a poppet valve in said chamber movable between a first position closing said outlet to a second, open position permitting the flow of gas through said outlet, and means for moving said poppet valve from said first position to said second, open position including a loading lever movable to actuate said poppet valve, a diaphragm movable toward said loading lever upon creation of a partial vacuum between said diaphragm and said loading lever and at least one cam lever movable between a position spaced from said loading lever to a position engaged to said loading lever upon movement of said diaphragm thereagainst.

17. An apparatus according to claim 16 further including adjustment means on said loading lever for limiting the extent to which said poppet valve can be opened.

18. An apparatus according to claim 16 wherein said diaphragm has a first layer of elastomer and a second layer of metal, said second layer being positioned to be engaged by said cam lever.

19. An apparatus according to claim 18 wherein said second layer is stainless steel having a thickness no greater than 0.030 inch.

20. An apparatus according to claim 16 wherein the said regulator has the capability of opening said poppet valve at a pressure as low as 1.5 inches of water pressure.

21. An apparatus according to claim 16 further including an adjustment mechanism on said loading lever to vary the amount of pressure required to open said poppet valve.

22. An apparatus according to claim 21 wherein said adjustment mechanism is threadedly engaged to said loading lever.

23. An apparatus according to claim 16 further including a compartment between said chamber and said loading lever and an actuator pin at least partially positioned in said compartment, said actuator pin having (i) a reduced size portion engageable with said poppet valve and (ii) being movable in said compartment upon movement of said loading lever to move said poppet valve to an open position.

* * * * *